United States Patent [19]
Mitchell

[11] Patent Number: 6,007,588
[45] Date of Patent: Dec. 28, 1999

[54] METHODS FOR COATING CURRENT COLLECTOR WITH POLYMERIC ADHESIVES

[75] Inventor: Porter H. Mitchell, Las Vegas, Nev.

[73] Assignee: Valence Technology, Inc., Henderson, Nev.

[21] Appl. No.: 09/024,211

[22] Filed: Feb. 17, 1998

[51] Int. Cl.$^6$ .......................... H01M 10/38; H01M 4/04
[52] U.S. Cl. ........................ 29/623.4; 29/623.5
[58] Field of Search ................. 29/623.4, 623.5

[56] References Cited

U.S. PATENT DOCUMENTS

| | | |
|---|---|---|
| 4,693,799 | 9/1987 | Yanagihara et al. . |
| 5,389,195 | 2/1995 | Ouderkirk et al. . |
| 5,824,120 | 10/1998 | Mitchell et al. ........................ 29/623.4 |

FOREIGN PATENT DOCUMENTS 87249351 10/1987 Japan .

OTHER PUBLICATIONS

Pedrow, et al., Deposition of Plasma–Polymerization Acetylene by an Intense Pulsed RF Plasma Source, IEEE Transactions on Plasma Science, 19, No. 6, (Dec. 1990) 945–947.
Chen et al., Pulsed Plasma Polymerization of Tetramethyltin: Nanoscale Compositional Control of Film Chemistry, Chem. Mater, 8, (no month) (1996) 1067–1077.
Savage et al., Molecular Control of surface Film Compositions via Pulsed Radio–Frequency Plasma Deposition of Perfluoropropylene Oxide, Chem. Mater., (no month) (1991) 3, 575–577.
Hynes, et al., Pulsed Plasma Polymerization of Perfluorocyclohexane, Macromolecules (1996) (no month) 29, 4220–4225.
Rinsch, et al., Pulsed Radio Frequency Plasma Polymerization of Allyl Alcohol: Controlled Deposition of surface Hydroxyl Groups, Langmuir (1996) (no month) 12, 2995–3002.
Hwu, et al., Plasma Polymerization Using Pulsed Microwave Power, J. of Polymer Science (1992) (no month) 30, 409–418.

*Primary Examiner*—John S. Maples
*Attorney, Agent, or Firm*—Young & Basile, P.C.

[57] ABSTRACT

A plasma polymerization method of preparing an electrochemical cell wherein the composite electrode material adheres to the current collector to create good electrical contact is provided. The electrode/current collector comprises a current collector having a layer of electrically conductive polymeric adhesive material on at least one surface of the current collector and either a composite cathode and composite anode, wherein the layer of polymeric adhesive material is positioned between the current collector and composite electrode. The composite electrode remains substantially and permanently attached to the electrically conductive polymeric adhesive material layer on the surface(s) of the current collector during the life of the electrochemical cell or battery.

20 Claims, 1 Drawing Sheet

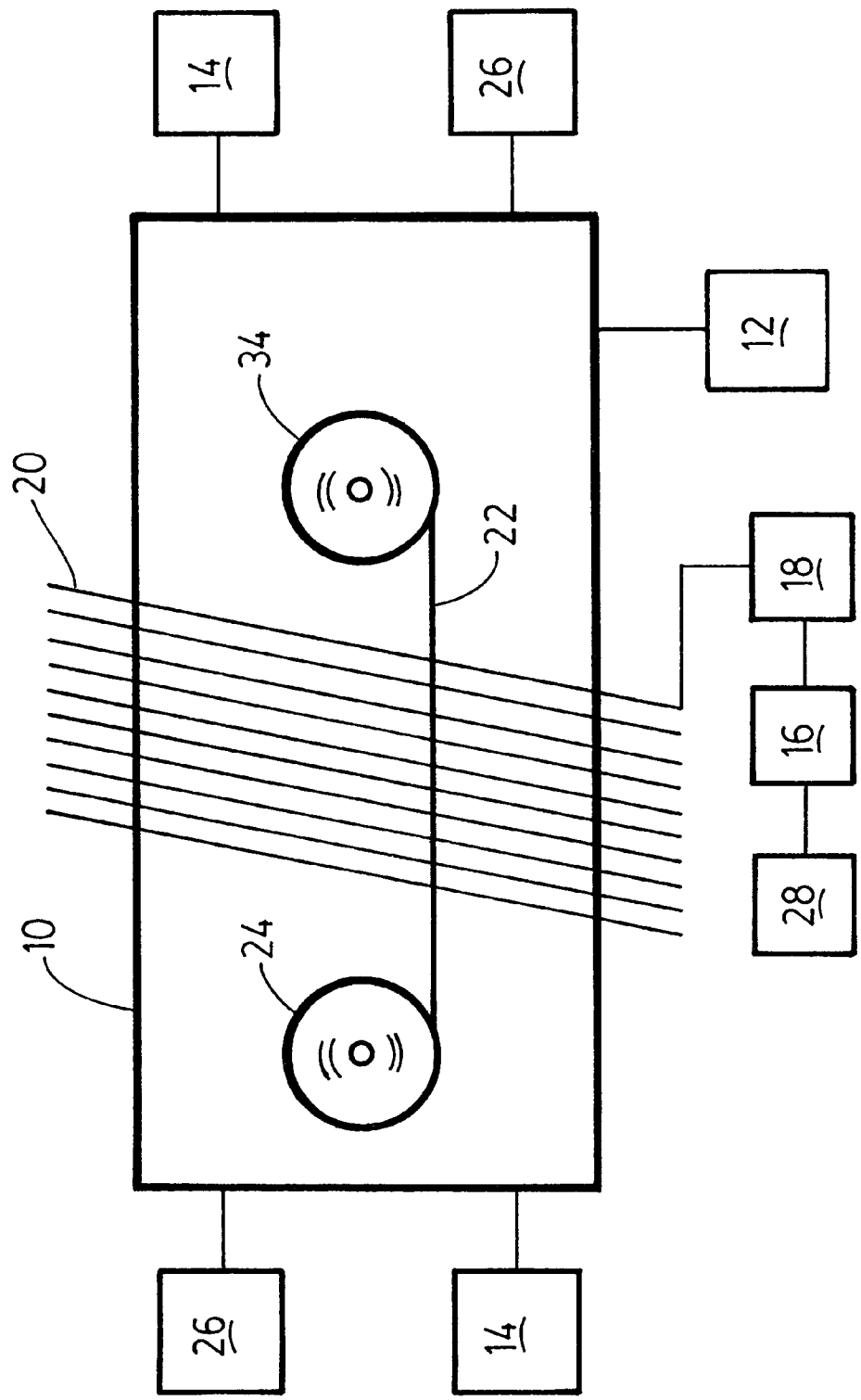
FIG._1.

METHODS FOR COATING CURRENT COLLECTOR WITH POLYMERIC ADHESIVES

FIELD OF THE INVENTION

The present invention relates to electrochemical devices and, more particularly, to non-aqueous electrochemical cells demonstrating improved performance.

BACKGROUND OF THE INVENTION

Non-aqueous lithium ion electrochemical cells typically include an anode, a lithium electrolyte prepared from a lithium salt dissolved in one or more organic solvents and a cathode of an electrochemically active material, typically an insertion compound. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium ion passes from the carbon through the electrolyte to the cathode where it is taken up just as in a cell with a metallic lithium anode. During recharge, the lithium ion is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

Composite electrodes refer to cathodes and anodes wherein the cathode is comprised of materials other than compatible cathodic materials and the anode is comprised of materials other than compatible anodic materials. Typically, the composite electrode contains a polymer which acts to bind the composite materials together. Composite electrodes are well known in the art. For example, a composite cathode can comprise a compatible cathodic material, a conductive material, and a polymeric binder. Similarly, for example, a composite anode can comprise a compatible intercalation anodic material and a polymeric binder.

In order to enhance the overall current produced by solid or liquid batteries, it is conventional to employ several electrochemical cells in a battery. When so employed, the current from each of the cells is accumulated so that the total current generated by the battery is roughly the sum of the current generated from each of the individual electrochemical cells employed in the battery. One method for accumulating the current from individual electrochemical cells employs a current collector that is attached to the cathode or the anode of the electrochemical cell. Typically, the current collector is a metal foil or grid or a conductive plastic which is coupled to other current collectors in the battery so that the current generated by each cell is collected and accumulated over all of the cells. Current collectors are described, for example, in U.S. Pat. Nos. 4,925,752, 5,011,501, 5,441,830 and 5,464,707. Thus, the total current generated by the battery is a summation of the current generated by each of the electrochemical cells employed in the battery minus whatever current is lost due to resistance in the current collector. To minimize resistance, a large contact surface area between the current collector and the electrode is employed. Notwithstanding the benefits of using current collectors in electrochemical cells, metal current collectors often do not adhere to electrodes. This inevitably reduces the performance of the cell and battery.

SUMMARY OF THE INVENTION

This invention is based, in part, on the recognition that formation of a layer of electrically conductive polymeric adhesive material on the surface of a metal current collector can improve the adhesion of the composite electrode to the current collector. In particular, the invention is based in part on the discovery that improved adhesion of composite electrodes to current collectors can be achieved by employing plasma polymerization to form a layer of electrically conductive polymeric adhesive on the surface of the current collector which comes into contact with the composite electrode. A conductive carbon material is also added in the polymerization process so that the polymeric layer is sufficiently electrically conductive. One feature of the invention is that electrochemical cells and batteries are expected to demonstrate improved performance. Preferred electrically conductive polymeric adhesives are derived from precursors, including, for example, fluoroalkanes and fluoroalicyclics and mixture thereof.

In one aspect, the invention is directed to a method of preparing an electrochemical cell that includes the steps of:

providing a composite cathode comprising a first polymeric binder and a cathode current collector;

providing a composite anode comprising a second polymeric binder and an anode current collector; and providing an electrolyte containing an electrolyte solvent and salt that is positioned between the composite cathode and composite anode, provided that at least one of said anode current collector or said cathode current collector has a layer of polymeric adhesive material coated on a surface thereof and the layer is fabricated by a plasma polymerization process that comprises the steps of:

positioning an electrically conductive substrate into a reactor chamber;

introducing gaseous precursors into the reactor chamber;

introducing an electrically conductive carbon material in the reactor chamber; and creating a plasma in the reactor chamber to cause the gaseous precursors to generate reactive species that polymerize to form a layer of polymeric adhesive material on a surface of the substrate.

BRIEF DESCRIPTION OF THE DRAWINGS

FIG. 1 is a schematic representation of a device for forming adhesive films by plasma polymerization.

DETAILED DESCRIPTION OF THE PREFERRED EMBODIMENTS OF THE INVENTION

The present invention is directed to a method of preparing current collectors and composite electrodes suitable for use in electrochemical devices, and particularly for use in electrochemical cells and batteries.

Preferred electrochemical cells include: a composite cathode comprising an active material and polymeric binder, a composite anode comprising an intercalation based carbon anode and polymeric binder, with each electrode capable of reversibly incorporating (e.g., intercalating) an alkali metal ion, and an electrolyte comprising a polymeric matrix containing an electrolyte solution comprising an organic electrolyte solvent and a salt of the alkali metal. At least one of the composite electrodes has a current collector that is coated with a layer of an electrically conductive polymeric adhesive material that is positioned between the composite electrode and current collector. Preferably, both composite electrodes are so constructed. The layer of electrically conductive polymeric adhesive material significantly improves the adhesion of the current collector to the composite electrode which results in a reduction in the impedance for the electrochemical cell and battery. Particularly preferred electrochemical cells and batteries use lithium and salts thereof. Although solid electrochemical cells are preferred, the invention is also applicable to liquid electrochemical cells wherein the electrolyte comprises a separator (e.g., glass fiber, polyethylene or polypropylene) and an electrolyte solution.

The composite electrode remains substantially and permanently attached to the layer of electrically conductive polymeric adhesive material that has been formed on the surface(s) of the current collector during the life of the electrochemical cell or battery.

The anode of the present invention generally comprises an anode film that is laminated onto one or both sides of the current collector. Typically, each anode film is from about 100 $\mu$m to about 250 $\mu$m in thickness, preferably about 110 $\mu$m to about 200 $\mu$m, and more preferably about 125 $\mu$m to about 175 $\mu$m Similarly, the cathode of the present invention generally comprises a cathode film that is laminated onto h cathode film is from about 100 $\mu$m to about 200 $\mu$m in thickness, preferably about 130 $\mu$m to about 175 $\mu$m, and more preferably about 140 $\mu$m to about 165 m.

The anode and cathode each also includes a current collector that comprises, for example, a screen, grid, expanded metal, foil, woven or non-woven fabric or knitted wire formed from electrically conductive materials such as metals or metal alloys. The term "current collector" refers to any suitable metallic current collector. Current collectors in the form of grids are preferred. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also preferably connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

A critical aspect of the present invention is that the current collector is coated with a layer of electrically conductive polymeric adhesive material which promotes adhesion of the composite electrode to the current collector. The improved electrical contact between the composite electrode and current collector results in a significant reduction in cell impedance which in turn improves cell performance, e.g., cycle life. It is expected that the polymeric binding material in the composite electrode will adhere well to the layer of polymeric adhesive material. It is also expected that the composite electrode will remain substantially and permanently attached to the electrically conductive polymeric adhesive material layer.

The electrical conductivity of the layer of polymeric adhesive material coated on the current collector preferably ranges from about 0.1 to about 100,000 S/cm; preferably it is higher than about 10 S/cm and more preferably it is higher than about 100 S/cm. The minimum thickness of the layer corresponds to a monolayer of the polymeric adhesive material and the thickness typically ranges from about 0.00001 in. to 0.01 in. (0.25 $\mu$m to 250 $\mu$m) and preferably from about 0.001 in. to 0.005 in. (25 $\mu$m to 125 $\mu$m).

The layer of polymeric adhesive material coated on the current collector is rendered sufficiently electrically conductive by the presence of a conductive filler such as carbon, e.g., graphite. When carbon is employed the layer of polymeric adhesive material contains about 10% to 40% carbon, and preferably about 15% to 25% carbon by weight.

However, prior to describing this invention in further detail, the following terms will be defined.

The term "plasma polymerization" refers to a process whereby precursor molecules are activated and polymerized in a plasma or glow discharge. Processing plasmas are produced and driven by external power supplies, which for example can range in frequency from dc up to 10 or so GHz, and in power up to about 40 kW. There are three basic types of plasmas used for thin film techniques. The first is applying a high voltage to a metal electrode or set of electrodes within a discharge chamber. These electrodes take the form of cathodes and anodes in a diode-like plasma. The second means for driving the plasma is by the application of electric fields, typically through an insulator. In this case, the high electric field is used to help break down the precursor gas and cause ionization. A third means of creating and sustaining a plasma is by the injection of large currents of electrons that are emitted thermionically from a filament or a related electron source. The electrons are accelerated into the plasma and can cause sufficient ionization to form the plasma. These plasma techniques are well known in the art and are described, for example, in *Thin Film Processes II*, Vossen et. al, Eds. Academic Press, Inc. (1991).

Suitable plasma polymerization processes can take place where the applied external power is continuous or pulsed. In pulsed plasma polymerization, the input power is pulsed or altered. Devices for pulse plasma polymerization are known in the art and are described, for example, in U.S. Pat. No. 4,693,799 and Hynes, et. al. Pulsed Plasma Polymerization of Perfluorocyclohexane, *Macromolecules*, 1996, 29, 4220–4225, and Hwa et. al. Plasma Polymerization using Pulsed Microwave Power, *J. of Polymer Sci. Part A: Polymer Chemistry*. 1992, 30, 409–418, which are incorporated by reference. Typically, the device comprises a vacuum chamber that is connected to a source of precursor molecules. The chamber also has means for generating a plasma wherein the chamber. The device may be a system that has internal electrodes or may be an electrodeless system which employs an external coil, for instance. Where the device includes a pair of electrodes, they are connected to an alternate power source. The alternate power source is equipped with a function generator and an amplifier and pulsing is accomplished by the burst control of the function generator. Other exemplary devices are described herein.

The term "precursors" or "precursor molecules" refer to suitable organic molecules including monomers and oligomers thereof which when subject to plasma polymerization will form films on current collectors that promotes adhesion of composite electrodes to the current collector. Precursor molecules include organic compounds that are gaseous in the vacuum chamber under plasma conditions. These include substituted and unsubstituted hydrocarbons and organometallics. Preferred precursors include, for example, alkanes, e.g., $C_1$–$C_6$ alkanes, alicyclic hydrocarbons, e.g., cyclopropane, cyclobutane, and cyclopentane, fluoroalkanes, and fluoroalicyclics e.g., perfluorocyclohexane and perfluorocyclopentane. Other potential precursors include, for example, carbonates and lactones, e.g., dimethyl carbonate, ethylene carbonate, propylene carbonate, ethel methyl carbonate, dimethoxyethane, and gamma butyrolactone. Suitable precursors are also described in U.S. Pat. No. 4,693,799, which is incorporated herein. If desired, mixtures comprising different precursors can be employed.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by liquid solvents including, for example, diethyl ether, dimethyl ether, methanol, cyclohexane, and mixtures thereof or by supercritical fluids. Preferred plasticizers include, for example, dibutyl phthalate, dioctylphthalate, and acetates, glymes and low molecular weight polymers. The plasticizer is preferably first well mixed with a polymer and a solvent. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of a salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and polymeric matrix with a electrolyte solution that is interposed therebetween.

The term "battery" refers to two or more electrochemical cells electrically interconnected in an appropriate series/ parallel arrangement to provide the required operating voltage and current levels.

The term "solid polymeric matrix" refers to an electrolyte compatible material formed by polymerizing an organic or inorganic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501, 921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. Suitable substrates include, for example, paper, e.g, 20 or 24 weight paper, polyester (MYLAR™), polypropylene, polyethylene films and non-woven webs.

Preferably, the solid polymeric matrix is formed by a casting process which does not require the use of monomers or prepolymers, that is, no curing is required. A preferred method employs a copolymer of vinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are lithium salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like.

The term "compatible electrolyte solvent" or "electrolytic solvent," or in the context of components of the non-aqueous electrolyte, just "solvent," is a low molecular weight organic solvent added to the electrolyte and/or the cathode composition, which may also serves the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, ethyl methyl carbonate, propylene carbonate, ethylene carbonate, methyl ethyl carbonate, gamma-butyrolactone, triglyme, tetraglyme, dimethylsulfoxide, dioxolane, sulfolane, and the like. A preferred solvent comprises a mixture of ethylene carbonate and ethyl methyl carbonate. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-(α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" 'refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The polymeric binder of the anode for the present invention preferably comprises a polymer blend which includes fluoropolymers as further described above. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-α-$MnO_2$ ($0\leq y<1$) which has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. The polymeric binder may comprise EPDM, PVDF, EAA, EVA, or EAA.EVA copolymers, and the like. Suitable binders for use in the cathode have a molecular weight of from about 1,000 to 5,000,000. The polymeric binder of the cathode for the present invention preferably comprises a polymer blend which includes fluoropolymers as further described above.

In one preferred embodiment, the cathode is prepared from a cathode paste which comprises from about 35 to 65 weight percent of a compatible cathodic material; from about 1 to 20 weight percent of an electroconductive agent;

from about 1 to 20 weight percent of a suitable polymeric binder comprising the polymer blend; from about 0 to about 20 weight percent of polyethylene oxide having a number average molecular weight of at least 100,000; and from about 10 to 50 weight percent of solvent comprising a 10:1 to 1:4 (w/w) mixture of an organic carbonate and a glyme. Also included is an ion conducting amount of an inorganic ion salt. Generally, the amount of the salt is from about 1 to about 25 weight percent.

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed. The electrolyte composition further typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent. The electrolyte composition moreover comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to modify current collectors suitable for prior art primary and secondary electrochemical cells. A feature of the present invention is that the polymeric binder (e.g., copolymer of VDF and HFP) of the composite electrode can be formed prior to being laminated onto the surface of a current collector that has been coated of the polymeric adhesive.

The polymeric adhesive films can be fabricated in the device shown in FIG. 1 that includes reactor chamber 10 which is connected to a vacuum pump 12 and precursor sources 14 and electrically conductive carbon sources 26. An rf generator 16 is inductively coupled to the precursor gas via LC matching circuit 18 and copper coil 20 that is wound externally around the reactor chamber. Pulse generator 28 is connected to the rf generator. The electrically conductive substrate (e.g., current collector material) is positioned in the center of the copper coils where the plasma will form and where much of the polymerization will take place. A web 22 of electrically conductive substrate, that is wound up on first roll 24, runs continuously in the center of the coils before being wound up on a second roll 34.

In operation, gaseous precursors and electrically conductive carbon materials are introduced continuously into the reactor chamber. Pulsing the ac voltage with the signal generator causes period breakdown of the precursors into reactive species which reacted with other reactive species and/or precursors. The thickness of the polymeric adhesive film on the web will depend on, among other things, the speed at which the web travels through the coils and the concentration of precursors in the reactor chamber. To increase the thickness of the polymeric adhesive layer and to improve its uniformity, portions of the web can be passed through the center region of the coils more than once.

It is expected that both sides of the current collectors will be coated with the polymeric adhesive. The precursor sources and electrically conductive carbon sources are strategically positioned so that both sides of the current collector will be uniformally exposed to precursor and carbon. Following formation of the polymeric adhesive layers, the web is cut to size to fabricate the current collectors that are employed with the composite anode and/or composite cathode.

The following examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the inventive current collectors, however, it is understood that the invention is applicable to other configurations, for example, where only one side of the anode and/or cathode current collector is laminated.

EXAMPLE 1

The anode current collector employed is a sheet of expanded copper metal that is about 50 $\mu$m thick that has been coated on both sides with a polymeric adhesive by the above process. It is available under the designation 2Cu5–125 (flatten) from Delker Corp., Branford, Conn. The anode slurry is prepared as follows:

A polymer mixture comprising a copolymer of vinylidenedifluroide (VDF) and hexafluoropropylene (HFP) is prepared by mixing 6.8 grams of the copolymer in 20 grams of acetone. The copolymer (ave. MW 125K) is Kynar Flex 2801™ from Elf Atochem North America, in Philadelphia, Pa. The mixture is stirred for about 24 hours in a milling jar available from VWR Scientific, in San Francisco, Calif., model H-04172-00. The copolymer functions as a binder for the carbon in the anode.

A graphite mixture is prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebrock, Belgium. The graphite mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it is laminated onto each side of the current collector. Anode films form when the remaining portion of the acetone evaporates.

EXAMPLE 2

The cathode current collector employed is a sheet of expanded aluminum that is about 50 $\mu$m thick that also has been coated on both sides by the inventive process. The aluminum grid is available under the designation 2AL5-077 from Delker Corp. The cathode slurry is prepared as follows:

A polymer mixture comprising a copolymer of vinylidenedifluroide (VDF) and hexafluoropropylene (HFP) is prepared by mixing 4.4 grams of the copolymer in 15 ml of acetone. The copolymer was Kynar Flex 2801™. The mixture is stirred for about 24 hours in a milling jar.

A cathode mixture is prepared separately by mixing 28.9 grams of $LiMn_2O_4$, 2.4 grams of carbon black (Super P™ into a solution containing 60 grams acetone, and 8.7 grams dibutyl phthalate. The mixture is then vigorously mixed in the a high shear mixer until a substantially homogeneous blend is formed.

The cathode slurry is prepared by mixing the polymer mixture and the cathode mixture together under low shear conditions to form the cathode slurry wherein the components are well mixed. A portion of the acetone is allowed to evaporate from the slurry before it is laminated onto each side of the current collector. Cathode films form when the remaining portion of the acetone evaporates.

The above anode and cathode films are formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, fumed silica filler, and the VDF/HFP copolymer on a suitable substrate or carrier web and allowing the acetone to evaporate. No curing by radiation is required. It is believed that the filler assist the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably Mn/Mw =1.0

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell comprising the steps of:
   providing a composite cathode comprising a first polymeric binder and a cathode current collector;
   providing a composite anode comprising a second polymeric binder and an anode current collector; and
   providing an electrolyte containing an electrolyte solvent and salt that is positioned between the composite cathode and composite anode, provided that at least one of said anode current collector or said cathode current collector has a layer of polymeric adhesive material coated on a surface thereof and the layer is fabricated by a plasma polymerization process that comprises the steps of:
   positioning a current collector into a reactor chamber;
   introducing gaseous precursors into the reactor chamber;
   introducing an electrically conductive carbon material in the reactor chamber; and
   creating a plasma in the reactor chamber to cause the gaseous precursors to generate reactive species that polymerize to form a layer of polymeric adhesive material on a surface of the current collector wherein the layer of polymeric adhesive material contains electrically conductive carbon material.

2. The method of claim 1 wherein each of the cathode current collector and the anode current collector has a surface that has a layer of polymeric adhesive material coated thereon.

3. The method of claim 2 wherein the layer of polymeric adhesive material on the cathode current collector attaches the cathode current collector to the composite cathode and wherein the layer of polymeric adhesive material on the anode current collector attaches the anode current collector to the composite anode.

4. The method of claim 1 wherein the step of creating the plasma comprises pulsing energy into the reactor chamber.

5. The method of claim 4 wherein said precursor is selected from the group consisting of fluoroalkanes, fluoroalicyclics and mixtures thereof.

6. The method of claim 1 wherein said first and second layers of polymeric adhesive material each has an electrical conductivity of greater than about 10 S/cm.

7. The method of claim 1 wherein said first and second layers of polymeric adhesive material each has a thickness ranging from about 0.25 $\mu$m to about 125 $\mu$m.

8. The method of claim 1 wherein the electrolyte further comprises a polymeric matrix.

9. The method of claim 1 wherein the first and second polymeric binder s comprise polyvinylidene fluoride.

10. The method of claim 1 wherein the current collector is material that is selected from the group consisting of a screen, grid, expanded metal, foil, woven fabric, non-woven fabric, and knitted wire.

11. Method of fabricating a composite electrode that is attached to a current collector which comprises the steps of:

positioning a current collector substrate in a reactor chamber;

introducing gaseous precursors into the reactor chamber;

introducing an electrically conductive carbon material in the reactor chamber;

creating a plasma in the reactor chamber to cause the gaseous precursors to generate reactive species that polymerize to form a layer of polymeric adhesive material on a surface of the substrate wherein the layer of polymeric adhesive material contains electrically conductive carbon material; and attaching an electrode layer comprising a polymeric binder and either an anode active material or a cathode material onto the layer of polymeric adhesive material.

12. The method of claim 11 wherein the electrode layer comprises an anode active material.

13. The method of claim 11 wherein the electrode layer comprises a cathode active material.

14. The method of claim 11 wherein the step of creating the plasma comprises pulsing energy into the reactor chamber.

15. The method of claim 14 wherein said precursor is selected from the group consisting of fluoroalkanes, fluoroalicyclics and mixtures thereof.

16. The method of claim 11 wherein said layer of polymeric adhesive material has an electrical conductivity of greater than about 10 S/cm.

17. The method of claim 11 wherein said layer of polymeric adhesive material has a thickness ranging from about 0.25 $\mu$m to about 125 $\mu$m.

18. The method of claim 13 wherein the cathode active material comprises $LiMn_2O_4$.

19. The method of claim 11 wherein the polymeric binder comprises polyvinylidene fluoride.

20. The method of to claim 11 wherein the current collector is material that is selected from the group consisting of a screen, grid, expanded metal, foil, woven fabric, non-woven fabric, and knitted wire.

* * * * *